(12) United States Patent
Horng

(10) Patent No.: US 7,809,415 B2
(45) Date of Patent: Oct. 5, 2010

(54) COUPLING STRUCTURE OF SLIDING TYPE

(76) Inventor: Chin-Fu Horng, 4F, No. 282, Chung San First Rd., Lu Chou City, Taipei Hsien (TW)

( * ) Notice: Subject to any disclaimer, the term of this patent is extended or adjusted under 35 U.S.C. 154(b) by 0 days.

(21) Appl. No.: 12/269,322

(22) Filed: Nov. 12, 2008

(65) Prior Publication Data

US 2010/0061042 A1    Mar. 11, 2010

(30) Foreign Application Priority Data

Sep. 8, 2008  (TW) ............................... 97216195 U
Sep. 19, 2008 (TW) ............................... 97216951 U

(51) Int. Cl.
    *H04M 1/00* (2006.01)
(52) U.S. Cl. ................ 455/575.4; 455/419; 361/679.56
(58) Field of Classification Search ............ 361/679.55, 361/679.56; 455/419, 575.4
    See application file for complete search history.

(56) References Cited

U.S. PATENT DOCUMENTS

| | | | | |
|---|---|---|---|---|
| 7,196,901 | B2 * | 3/2007 | Maskatia et al. ....... | 361/679.55 |
| 7,542,788 | B2 * | 6/2009 | Lee .......................... | 455/575.4 |
| 2005/0018394 | A1 * | 1/2005 | Park et al. .................... | 361/683 |
| 2005/0122669 | A1 * | 6/2005 | Lee ........................... | 361/679 |
| 2006/0176654 | A1 * | 8/2006 | Kfoury ....................... | 361/681 |
| 2007/0058328 | A1 * | 3/2007 | Zuo et al. ................... | 361/679 |
| 2007/0058330 | A1 * | 3/2007 | Lin ............................. | 361/681 |
| 2007/0091555 | A1 * | 4/2007 | Lee .............................. | 361/683 |
| 2007/0097607 | A1 * | 5/2007 | Lee ............................. | 361/679 |
| 2007/0153452 | A1 * | 7/2007 | Harmon et al. ............. | 361/679 |
| 2007/0155451 | A1 * | 7/2007 | Lee .......................... | 455/575.4 |
| 2008/0058039 | A1 * | 3/2008 | Lee et al. .................. | 455/575.4 |
| 2008/0137273 | A1 * | 6/2008 | Li et al. ...................... | 361/681 |
| 2008/0139260 | A1 * | 6/2008 | Kauhaniemi et al. ..... | 455/575.4 |
| 2008/0146297 | A1 * | 6/2008 | Ho ........................... | 455/575.4 |
| 2008/0153558 | A1 * | 6/2008 | Mifune et al. ............. | 455/575.4 |
| 2008/0180895 | A1 * | 7/2008 | Jin et al. ...................... | 361/681 |
| 2008/0207284 | A1 * | 8/2008 | Jung et al. ................ | 455/575.4 |
| 2009/0027836 | A1 * | 1/2009 | Wakihara ..................... | 361/679 |
| 2009/0027837 | A1 * | 1/2009 | Cho et al. .............. | 361/679.01 |
| 2009/0035056 | A1 * | 2/2009 | Kim et al. .................... | 403/326 |
| 2009/0109614 | A1 * | 4/2009 | Ahn et al. ............... | 361/679.55 |
| 2009/0147453 | A1 * | 6/2009 | Hsieh et al. ............ | 361/679.02 |
| 2009/0147471 | A1 * | 6/2009 | Francisco et al. ....... | 361/679.56 |
| 2009/0149229 | A1 * | 6/2009 | Li et al. .................... | 455/575.4 |
| 2009/0163259 | A1 * | 6/2009 | Li et al. .................... | 455/575.4 |
| 2009/0168334 | A1 * | 7/2009 | Wang .................... | 361/679.55 |
| 2009/0251854 | A1 * | 10/2009 | Leung ................... | 361/679.09 |

\* cited by examiner

*Primary Examiner*—Lisa Lea-Edmonds
(74) *Attorney, Agent, or Firm*—Rosenberg, Klein & Lee

(57) ABSTRACT

A coupling structure includes a first slide member, a second slide member slidably connected to the first slide member so as to be slidable relative to each other, and a spring member. The spring member has two opposite ends and a plurality of resilient turnings arranged in a predetermined sequence so as to have the same turning direction such that the resilient turnings are juxtaposed to one another and extend along a planar direction. The opposite ends of the spring member are connected respectively to the first and second slide members. Movement of the first and second slide members to a first position causes the spring member to possess a restoration force that is capable of retaining the first and second slide members at a second position different from the first position.

12 Claims, 5 Drawing Sheets

COUPLING STRUCTURE OF SLIDING TYPE

This application claims the benefit of Taiwan Patent Application Serial NO. 097216195 filed on Sep. 8, 2008 and 097216951 filed on Sep. 19, 2008 the subject matter of which is incorporated herein by reference.

FIELD OF THE INVENTION

The present invention relates to a coupling structure of sliding type, more particularly to ones that is implemented in an electronic device such that two parts of the electronic device are slidable relative to each other in a stable manner.

BACKGROUND OF THE INVENTION

More and more people care about the display medium of an electronic device, such as mobile phones, notebook computers, portable games and PDAs. In order to increase the area of the display medium, some electronic devices are constructed in foldable type or slidable type. Though the sliding type electronic device is much appreciated by the consumers but the structure is somewhat complicated.

Presently, most of the mobile phones are designed in the sliding type. However, one part is moved manually to space apart from the other. Only a few mobile phones are provided with automatic sliding mechanism at the distal portion thereof so that one part may eject out from the other in a sudden impact, thereby retaining the parts at the use position. It is noted that the sudden impact resulted from ejection of one part relative to the other may cause discomfort to the user.

It is for the manufacturers to explore, which type of coupling structure is handy for the electronic device. In the past, a coil spring is used to interconnect two metal parts so as to provide handy feeling to the user. However, the restoration force of the coil spring depends on the thickness of the coil or diameter of the coil. Due to limited space in the electronic device, it is difficult to adjust the diameter of the coil, thereby restricting the utility of such coil spring in the electronic device and cannot fulfill the designed requirement of the user.

In another prior art technology, a resilient member is used for interconnecting two metal parts of the electronic device. The problem resides in that the resilient member has a plurality of coils overlapping one another and it is relatively hard to control the restoration force of the resilient member. Though, the coils can be stored in the overlapped manner but still occupy a relatively large thickness and is therefore against the trend to produce the device in compact size.

In order to enhance the deformation range of the resilient member or springs, the latter may have symmetric wave-like sections for interconnecting two metal parts of the electronic device. Slidable movement between the metal parts is quite large and may result in pressing of the wave-like sections into curved formations when moving toward each other and the restoration force provided thereby is poor and non-suitable in practical use.

SUMMARY OF THE INVENTION

The object of the present invention is to provide a coupling structure of sliding type for use in an electronic device such that sliding movement between two parts of the device provides a handy feeling to the user meanwhile an ideal restoration force is also generated.

In one aspect of the present invention, a coupling structure of sliding type is provided to include a first slide member, a second slide member and a spring member.

The second slide member is slidably connected to the first slide member so as to be slidable relative to each other.

The spring member has two opposite ends and a plurality of resilient turnings arranged in a predetermined sequence so as to have the same turning direction such that the resilient turnings are juxtaposed to one another. The opposite ends of the spring member are connected respectively to the first and second slide members.

Movement of the first and second slide members to a first position causes deformation of the spring member to possess a restoration force that is capable of retaining the first and second slide members at a second position different from the first position.

The coupling device of the present invention is implemented in an electronic device, such as a mobile phone. Since the spring member has a plurality of resilient turnings arranged in the same turning direction such that the resilient turnings are juxtaposed to one another and provides an ideal restoration force and handy feeling when two parts, slidably connected to each other by the coupling structure of the present invention, move relative to each other.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENTS

Figure 1:
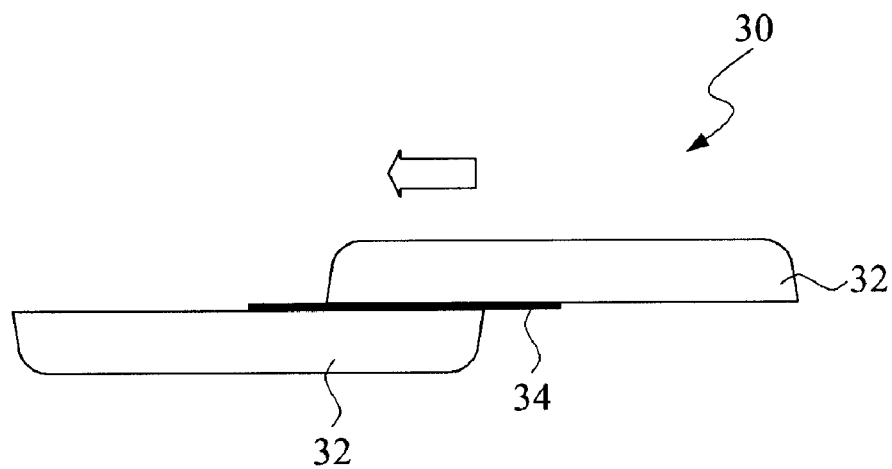
FIG. 1 is a schematic side view of a mobile phone equipped with a sliding type coupling structure of the present invention.

FIG. 1 is a schematic side view of a mobile phone 30 equipped with a sliding type coupling structure 34 of the present invention. The coupling structure 34 of the present invention can be implemented in the mobile phones, notebook computers, handheld TV games, PDAs (Personal Digital Assistant) and any electronic device having two slide members 32 slidable relative to each other via the coupling structure 34.

Figure 2:
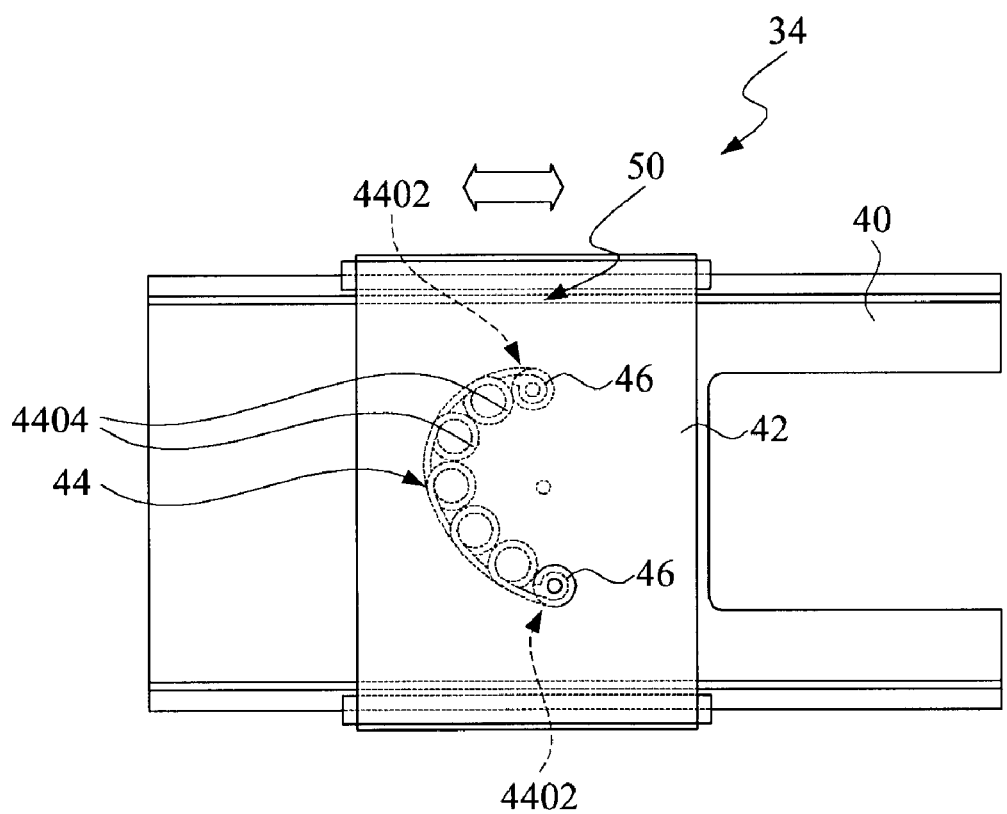
FIG. 2 shows how two parts of the mobile phone are equipped with the coupling structure of the present invention and are moved to a first position.

FIG. 2 shows how two slide members 32 of the mobile phone 30 are moved to a first position 50 by the coupling structure 34 of the present invention. The coupling structure of the present invention includes a first slide member 40 and a second slide member 42 fixed respectively to the two slide parts 32 so as to be slidable relative to each other, and a spring member 44. When the first and second slide members 40, 42 are disposed to extend in a planar direction, the first and second slide members 40, 42 cooperatively define a predetermined clearance therebetween. The spring member 44 is disposed in the predetermined clearance to interconnect the first and second slide members 40, 42.

The spring member 44 has two opposite ends 4402 and a plurality of resilient turnings 4404 arranged in a predetermined sequence so as to have the same turning direction such that the resilient turnings are juxtaposed to one another and that the resilient turnings extend generally along a planar direction. The opposite ends 4402 of the spring member 44 are connected respectively to the first and second slide members 40, 42. In this embodiment, each of the first and second slide members 40, 42 is formed with a coupler pin 46. The opposite ends 4402 of the spring member 44 are in the form of loops for respectively sleeving around the coupler pins 46 of the first and second slide members 40, 42.

After the first and second slide members 40, 42 are interconnected by the spring member 44, movement of the first and second slide members 40, 42 to a first position 50 causes deformation of the resilient turnings in the spring member 44 to possess a restoration force that is capable of retaining the first and second slide members 40, 42 at a second position 52 different from the first position 50. Note that the restoration force of the spring member 44 is resulted from deformation of the resilient turnings 4404 of the spring member 44.

When the first and second slide members 40, 42 are retained at the second position 52, they cooperatively define a predetermined distance therebetween. The first position 50 is located at a middle of the predetermined distance.

Figure 3:
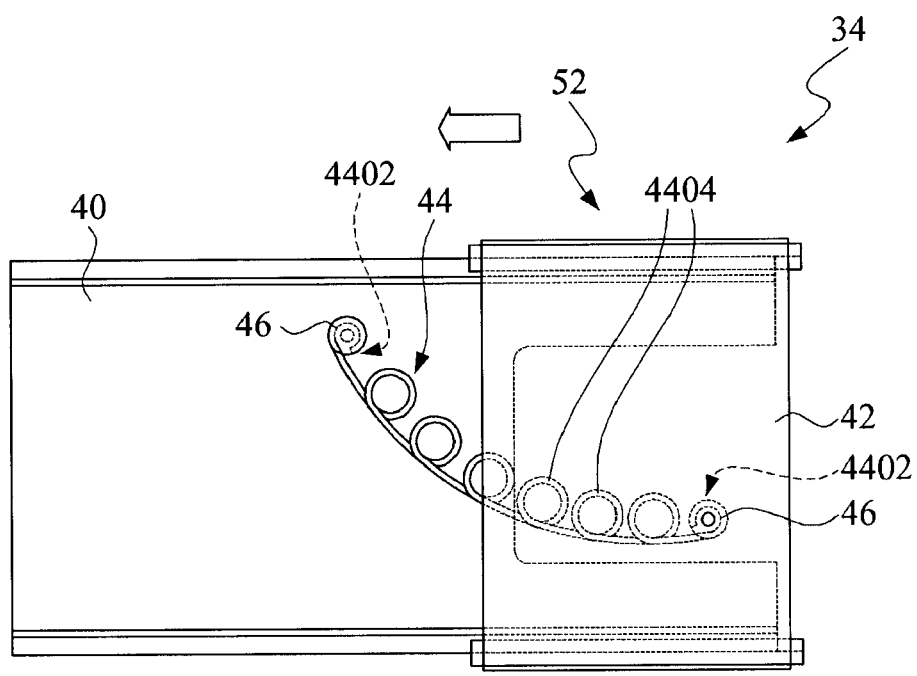
FIG. 3 illustrates how two slide members of the coupling structure of the present invention are moved to a second position.

FIG. 3 illustrates how two slide members of 40, 42 the coupling structure 34 of the present invention are moved to the second position. As a matter of fact, the first position 50 of the slide members shown in FIG. 2 is not stable (stationary), and the spring member 44 has the most flexibility so as to extend in the left and right direction in the greatest extent. The second position 52 of the slide members 40, 42 is stable and stationary. In other words, the slide members 40, 42 are retained securely at the second position 52.

Figure 4:
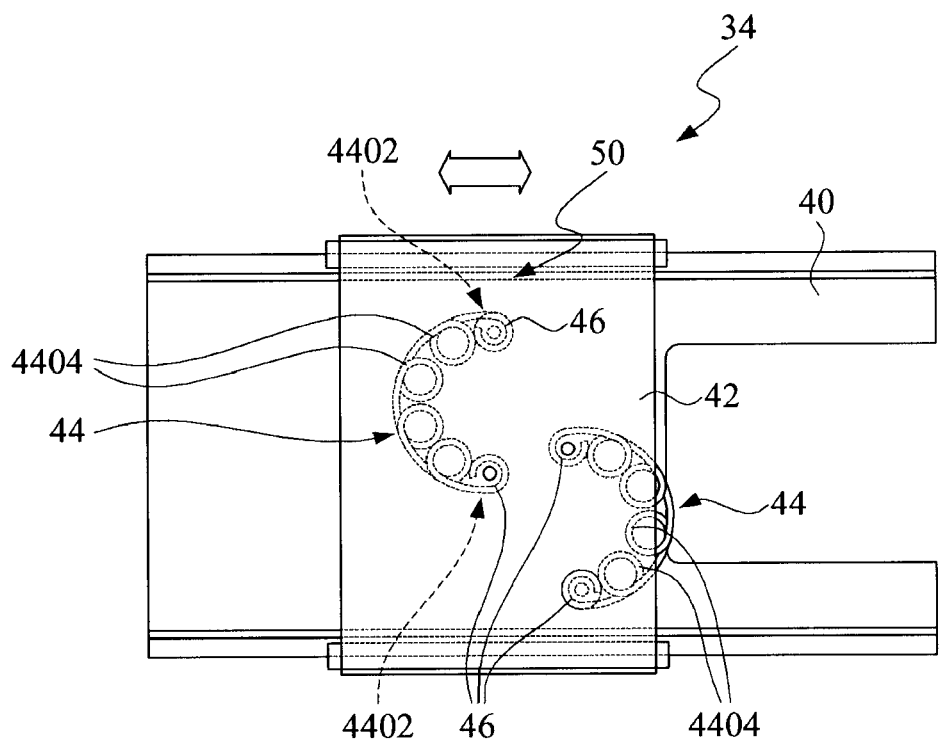
FIG. 4 shows two parts of the mobile phone equipped with a first modified coupling structure of the present invention.

FIG. 4 shows two slide members 40, 42 of a first modified coupling structure 34 of the present invention at the first position. In this modified structure, two spring members 44 having the same structure are used for interconnecting the first and second slide members 40, 42.

To be more specific, the spring members 44 have two first ends 4402 sleeved around the coupling pins 46 at a middle portion of the first slide member 40 and two second ends 4402 connected respectively to two opposite sides of the second slide member 44 via two coupler pins 46 without interference between the spring members 44.

Figure 5:
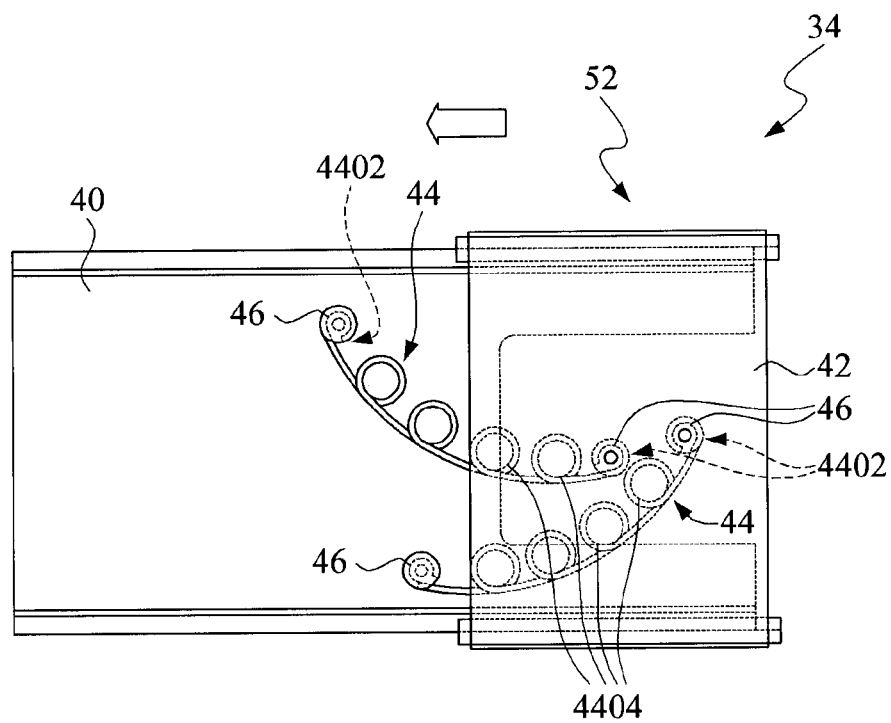
FIG. 5 shows two slide members of a second modified coupling structure of the present invention at a second position.

FIG. 5 shows two slide members 40, 42 of a second modified coupling structure 34 of the present invention at a second position. The first position 50 of the slide members 40, 42 in FIG. 4 is not stable, and the spring member 44 has the most flexibility so as to extend in the left and right direction in the greatest extent. The second position 52 of the slide members 40, 42 is stable and stationary. In other words, the slide members 40, 42 are retained securely at the second position 52.

In addition, when the first and second slide members 40, 42 are retained at the second position, the loop at one end 4402 of one of the two spring members 44 sleeved around the coupler pin 46 abuts against one of the resilient turnings 4404 of the other one of the two spring members 44, thereby enhancing the stability of the first and slide members 40, 42 at the second position. Moreover, the distal ends of each spring member 44 are in the form of loops for sleeving respectively around the coupler pins 46 of the slide members 40, 42. The collision of the loops of the spring members 44 against the coupler pins 46 in the slide members also retard the impact force between the first and second slide members during moving to the first and second positions.

Figure 6:
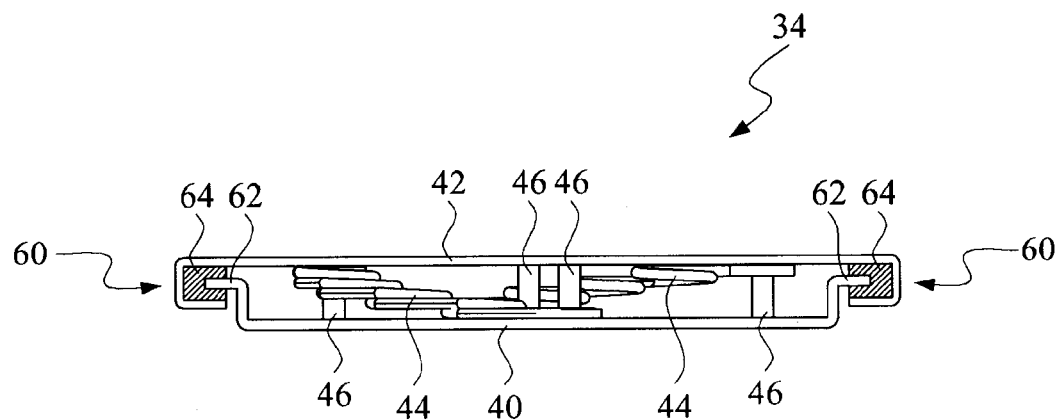
FIG. 6 is a side view illustrating a third modified coupling structure of the present invention.

FIG. 6 is a side view illustrating a third modified coupling structure 34 of the present invention, In this embodiment, the second slide member 42 is formed with two sliding channels 60 while the first slide member 40 has two guide flanges 2 slidably extending and respectively into the sliding channels 60 to facilitate relative movement between the first and second slide members 40,42.

Preferably, the first and second slide members 40, 42 are made from metals by punching process. The two sliding channels 60 in the second slide member 42 are simultaneously formed during the punching process. The coupling structure 34 further includes two plastic blocks 64 press-fitted to the second slide member 42 to define the sliding channels 60 for slidably receiving the guide flanges 62 of the first slide member 40.

Figure 7:
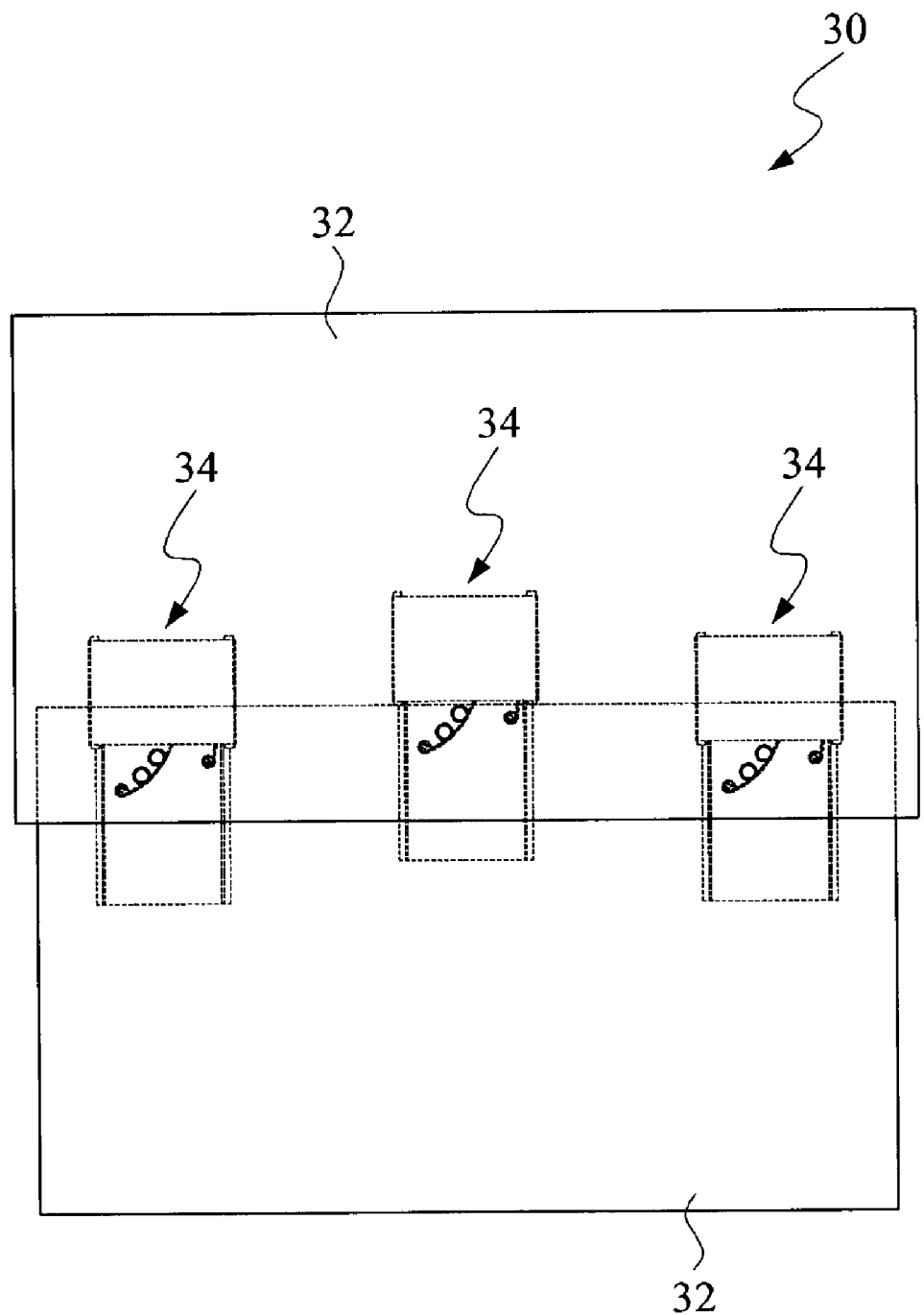
FIG. 7 is top view of a fourth modified coupling structure of the present invention.

FIG. 7 shows a top view of a fourth modified coupling structure 34 of the present invention, which is used to interconnect two sliding parts 32 of a mobile phone 30 as shown in FIG. 1. The mobile phone has an operation system with complicated multi functions. In order to expose the wide and large display screen and the key pad, the sliding parts 32 thereof are designed symmetrically. Unlike to the previous embodiment, a third set of spring members 44 is installed between the sliding parts 32 in addition the previous sets of spring members 44 to slide stably along a horizontal direction.

Figure 8:
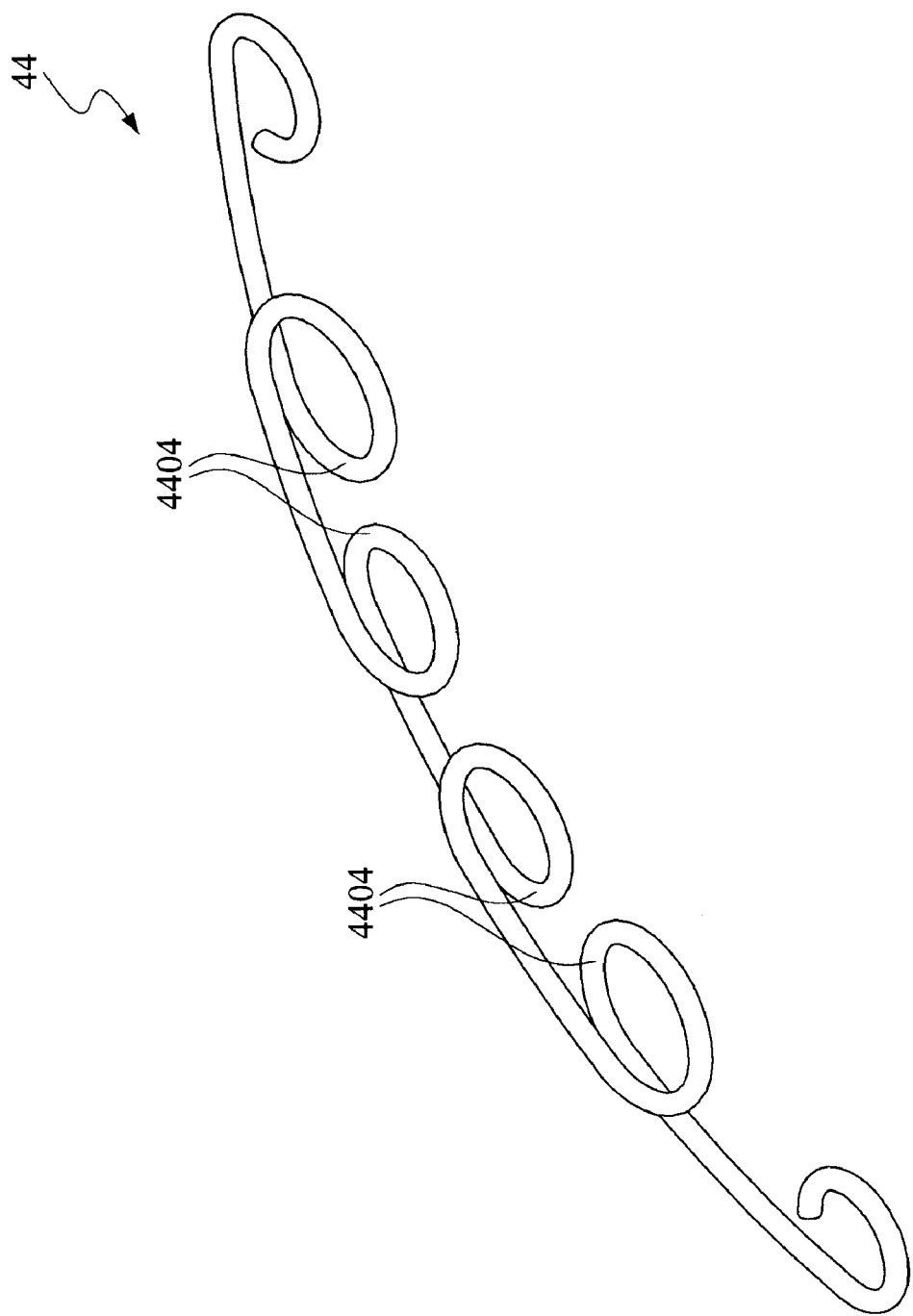
FIG. 8 is a perspective view of a spring member employed in the coupling structure of the present invention.

FIG. 8 is a perspective view of a spring member 44 employed in the coupling structure of the present invention. As illustrated, the resilient turnings 4404 of the spring member 44 are arranged in a plurality of sets, each set including two of the resilient turnings 4404. Note that the sets of resilient turnings 4404 are juxtaposed to one another that the resilient turnings extend generally along a planar direction. When the spring member 44 of the present invention is thus arranged, thickness thereof is reduced and therefore is suitable for use in the sliding type mobile phone.

The sliding type coupling structure 34 of the present invention is implemented to interconnect two slide parts 32 of an electronic device, such as mobile phone. The resilient turnings 4404 of the spring member 44 are arranged in a predetermined sequence so as to have the same turning direction such that the resilient turnings are juxtaposed to one another and that the resilient turnings extend generally along a planar direction. When the coupling structure 34 is used in the mobile phone, the resilient turnings 4404 of the spring member 44 provide an ideal distance and handy feeling to the user.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:
1. A coupling structure of sliding type, comprising:
a first slide member;
a second slide member slidably connected to said first slide member so as to be slidable relative to each other; and
a single continuous spring member having two opposite ends and a plurality of resilient windings, each one of said resilient windings laterally displaced each from the other, each one of said windings arranged in a predetermined sequence so as to have the same turning direction, said opposite ends being connected respectively to said first and second slide members;

wherein, movement of said first and second slide members to a first position causes said spring member to possess a restoration force that is capable of retaining said first and second slide members at a second position different from said first position.

2. The coupling structure according to claim 1, wherein said second slide member is formed with a sliding channel, said first slide member having a guide flange slidably extending into said sliding channel to facilitate relative movement between said first and second slide members.

3. The coupling structure according to claim 2, wherein said first and second slide members are made from metals by punching process, the coupling structure further comprising a plastic block attached to said second slide member to define said sliding channel for slidably receiving said guide flange of said first slide member.

4. The coupling structure according to claim 1, wherein the coupling structure includes at least two of said spring members.

5. The coupling structure according to claim 4, wherein when said first and second slide members are retained at said second position, one end of one of said two spring members abutting against one of said resilient windings of the other one of said two spring members.

6. The coupling structure according to claim 4, wherein said resilient windings of the other one of said two spring members has the same windings direction of said one of said two spring members.

7. The coupling structure according to claim 4, wherein said spring members have two first ends connected to a middle portion of said first slide member and two second ends connected respectively to two opposite sides of said second slide member.

8. The coupling structure according to claim 1, wherein each of said first and second slide members is formed with a coupler pin, said opposite ends of said spring member being in the form of loops for sleeving respectively around said coupler pins of said first and second slide members.

9. The coupling structure according to claim 1, wherein said first and second slide members cooperatively define a predetermined distance therebetween when said first and second slide members are retained at said second position, said first position being located at a middle of said predetermined distance.

10. The coupling structure according to claim 1, wherein said restoration force of said spring member is resulted from deformation of said resilient windings of said spring member.

11. The coupling structure according to claim 1, wherein a clearance is formed between said first and second slide members, said spring member being disposed in said clearance for connecting said first and second slide members so as to be slidable relative to each other.

12. The coupling structure according to claim 1, wherein said resilient windings of said spring member are arranged in a plurality of sets, each set including two of said resilient turnings.

\* \* \* \* \*